US012567784B2

(12) United States Patent
Noami et al.

(10) Patent No.: US 12,567,784 B2
(45) Date of Patent: Mar. 3, 2026

(54) VEHICLE AND COOLING STRUCTURE FOR ELECTRICAL COMPONENT

(71) Applicant: KAWASAKI MOTORS, LTD., Akashi (JP)

(72) Inventors: Takuya Noami, Akashi (JP); Masaki Nishiyabu, Akashi (JP); Yasuhiko Sakaguchi, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 317 days.

(21) Appl. No.: 18/195,925

(22) Filed: May 10, 2023

(65) Prior Publication Data

US 2023/0369942 A1     Nov. 16, 2023

(30) Foreign Application Priority Data

May 12, 2022     (JP) ................................. 2022-079057

(51) Int. Cl.
| | |
|---|---|
| *B60K 11/06* | (2006.01) |
| *H02K 5/20* | (2006.01) |
| *H02K 7/00* | (2006.01) |
| *H02K 9/02* | (2006.01) |
| *B60K 1/00* | (2006.01) |
| *B62K 19/48* | (2006.01) |

(52) U.S. Cl.
CPC .............. *H02K 9/02* (2013.01); *H02K 5/207* (2021.01); *H02K 7/006* (2013.01); *B60K 2001/006* (2013.01); *B62K 19/48* (2013.01)

(58) Field of Classification Search
CPC .. B60K 2001/006; B60K 25/02; B60K 11/06; B60K 11/08; H02K 9/02; H02K 5/207; B60Y 2400/204; B60Y 2200/12
USPC ......................................... 180/68.1; 296/208
See application file for complete search history.

(56) References Cited

U.S. PATENT DOCUMENTS

| | | | | |
|---|---|---|---|---|
| 8,973,697 | B2 * | 3/2015 | Matsuda ................ | B62K 11/04 |
| | | | | 474/93 |
| 10,023,264 | B2 * | 7/2018 | Hayslett ................. | B62K 19/02 |
| 2011/0011654 | A1 * | 1/2011 | Kubota .................... | B60K 1/04 |
| | | | | 903/903 |

(Continued)

FOREIGN PATENT DOCUMENTS

| | | |
|---|---|---|
| EP | 2963784 A1 | 1/2016 |
| WO | 2014-132719 A1 | 9/2014 |

*Primary Examiner* — Roger L Pang
(74) *Attorney, Agent, or Firm* — PROCOPIO, CORY, HARGREAVES & SAVITCH LLP

(57) ABSTRACT

There are provided a vehicle and a cooling structure for an electrical component including: a cover including a cover inlet that introduces air into an accommodation space for the electrical component, and a cover outlet that discharges air from the accommodation space; and a duct including a duct inlet facing forward in a traveling direction, a duct outlet communicating with the cover inlet, a duct flow path that guides air flowing from the duct inlet to the duct outlet, and a deflection wall that deflects a flow of air inside the duct flow path. The duct flow path includes an outlet flow path positioned on a downstream side of the deflection wall in a flow direction of air and extending toward the duct outlet, and the electrical component is disposed to face the cover inlet in an extending direction of the outlet flow path.

11 Claims, 8 Drawing Sheets

(56) References Cited

U.S. PATENT DOCUMENTS

2013/0256049 A1    10/2013  Matsuda
2023/0109484 A1*    4/2023  Ueno ...................... B62J 50/30
                                            180/68.1

* cited by examiner

TRAVELING WIND

UP

FRONT ← → REAR

DOWN

VEHICLE AND COOLING STRUCTURE FOR ELECTRICAL COMPONENT

CROSS-REFERENCE TO RELATED APPLICATIONS

This application is based on and claims priority under 35 USC 119 from Japanese Patent Application No. 2022-079057 filed on May 12, 2022, the contents of which are incorporated herein by reference.

TECHNICAL FIELD

The present disclosure relates to a vehicle and a cooling structure for an electrical component.

BACKGROUND ART

There is known a vehicle in which an electrical equipment mounted on the vehicle is cooled by using traveling wind during traveling of the vehicle. For example, WO2014/132719A1 discloses an engine unit including, in an engine cover, a wind guide duct for taking in traveling wind during traveling of a vehicle. In this engine unit, an increase in temperature of an electrical component in the engine cover is prevented by the traveling wind introduced into the engine cover through the wind guide duct.

When traveling wind during traveling of a vehicle is used for cooling an electrical component in a space covered by a cover, a foreign object may enter the space from outside together with the traveling wind.

SUMMARY OF INVENTION

Therefore, the present disclosure provides a vehicle and a cooling structure for an electrical component that prevent an increase in temperature of an electrical component in a cover and prevent an influence of entry of a foreign object into the cover.

According to an illustrative aspect of the present disclosure, a vehicle includes: a vehicle body frame; an electrical component supported on the vehicle body frame; a cover that defines an accommodation space in which the electrical component is accommodated, the cover including a cover inlet configured to introduce air into the accommodation space, and a cover outlet configured to discharge air from the accommodation space; and a duct connected to the cover, the duct including a duct inlet facing forward in a traveling direction, a duct outlet communicating with the cover inlet, a duct flow path configured to guide air flowing from the duct inlet to the duct outlet, and at least one deflection wall configured to deflect a flow of air inside the duct flow path. The duct flow path includes an outlet flow path that is a flow path positioned on a downstream side of the deflection wall in a flow direction of air and extending toward the duct outlet, and the electrical component is disposed to face the cover inlet in an extending direction of the outlet flow path.

According to another illustrative aspect of the present disclosure, a vehicle includes: a vehicle body frame; an electrical component supported on the vehicle body frame; a cover that defines an accommodation space in which the electrical component is accommodated, the cover including a cover inlet configured to introduce air into the accommodation space, and a cover outlet configured to discharge air from the accommodation space; and a duct connected to the cover, the duct including a duct inlet facing forward in a traveling direction, a duct outlet communicating with the cover inlet, a duct flow path configured to guide air flowing from the duct inlet to the duct outlet, and at least one deflection wall configured to deflect a flow of air in the duct flow path. The duct includes a discharge wall having a through hole penetrating in an up-down direction, the discharge wall being positioned on an upstream side of the deflection wall in the flow direction, and connected to a lower end portion of the deflection wall.

According to another illustrative aspect of the present disclosure, a cooling structure for cooling an electrical component mounted on a vehicle that is capable of traveling, includes: the electrical component; a cover that defines an accommodation space in which the electrical component is accommodated, the cover including a cover inlet configured to introduce air into the accommodation space, and a cover outlet configured to discharge air from the accommodation space; and a duct connected to the cover, the duct including a duct inlet facing forward in a traveling direction, a duct outlet communicating with the cover inlet, a duct flow path configured to guide air flowing from the duct inlet to the duct outlet, and at least one deflection wall configured to deflect a flow of air in the duct flow path. The duct flow path includes an outlet flow path that is a flow path positioned on a downstream side of the deflection wall in a flow direction of air and linearly extending from the duct outlet, and the electrical component is disposed to face the cover inlet in an extending direction of the outlet flow path.

According to the present disclosure, it is possible to provide a vehicle and a cooling structure for an electrical component that prevent an increase in temperature of an electrical component in a cover and prevent an influence of entry of a foreign object into the cover.

DESCRIPTION OF EMBODIMENTS

Hereinafter, an embodiment will be described with reference to the drawings.

Figure 1:
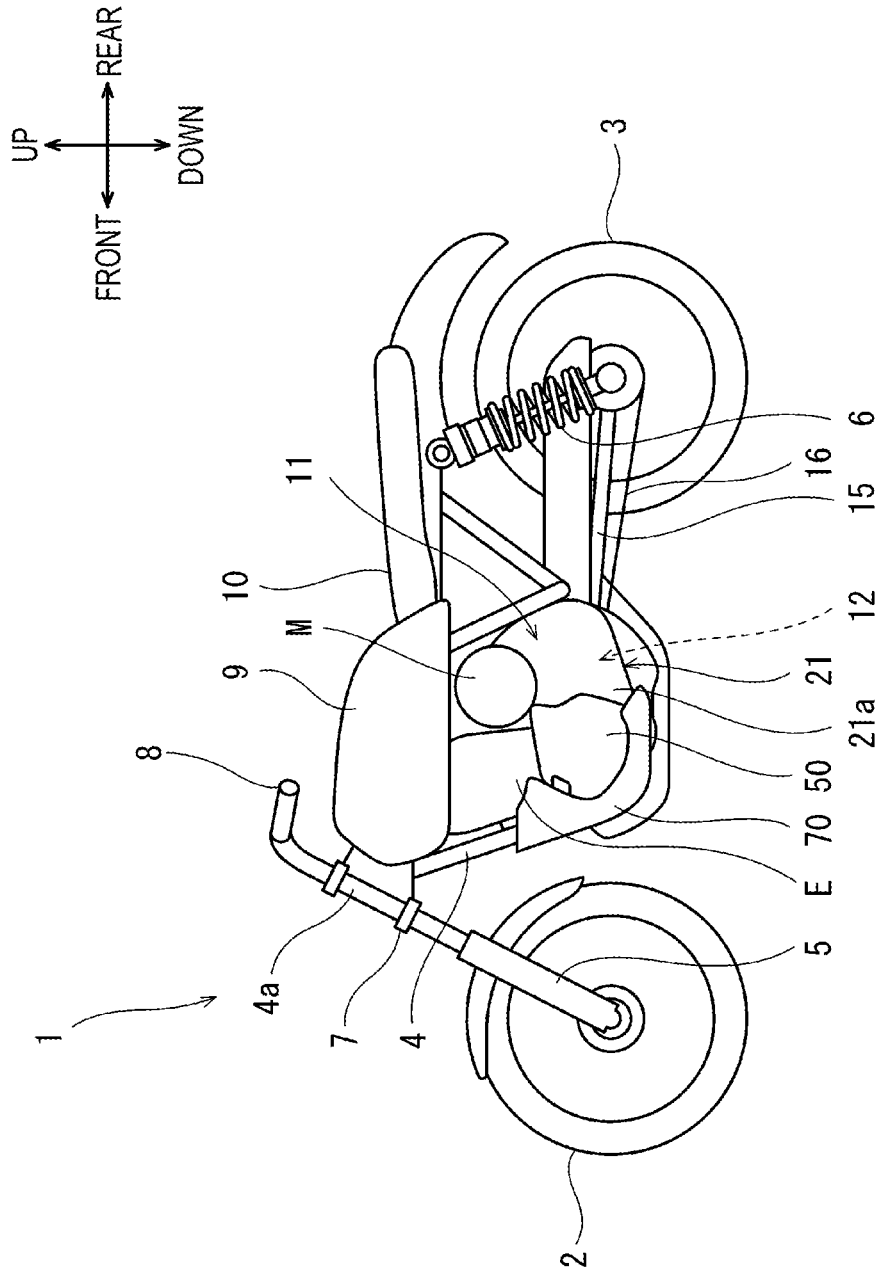
FIG. 1 is a left side view illustrating a motorcycle, which is a vehicle according to an embodiment.

FIG. 1 is a left side view illustrating a motorcycle 1, which is a vehicle according to an embodiment. The motorcycle 1 is an example of a vehicle capable of turning while a vehicle body is banked from an upright state to one side in a left-right direction. In the following description, based on directions viewed by a rider of the motorcycle 1, a front-rear direction corresponds to a vehicle length direction, and the left-right direction corresponds to a vehicle width direction.

In the following description, a side close to a center plane C (see FIG. 4) in the vehicle width direction of the motorcycle 1 is referred to as an inner side in the vehicle width direction, and a side far from the center plane C in the vehicle width direction of the motorcycle 1 is referred to as an outer side in the vehicle width direction.

The motorcycle 1 includes a front wheel 2, a rear wheel 3, a vehicle body frame 4, a front suspension 5 connecting the front wheel 2 to a front portion of the vehicle body frame 4, and a rear suspension 6 connecting the rear wheel 3 to a rear portion of the vehicle body frame 4. The front suspension 5 is connected to brackets 7 arranged at intervals in an up-down direction. A steering shaft connected to the bracket 7 is supported by a head pipe 4a, which is a part of the vehicle body frame 4, in a manner of being angularly displaceable. The steering shaft is provided with a handle 8 which is to be gripped by a rider with his/her hands. A fuel tank 9 is provided behind the handle 8, and a seat 10 on which the rider sits is provided behind the fuel tank 9.

Swing arms 15 each supporting the rear wheel 3 and extending in the front-rear direction are supported by the vehicle body frame 4 in a manner of being angularly displaceable. An engine unit 11 serving as a travel driving source is mounted on the vehicle body frame 4 between the front wheel 2 and the rear wheel 3.

In this example, the motorcycle 1 is a hybrid vehicle. The engine unit 11 includes an engine E, which is an internal combustion engine serving as a prime mover, and a drive motor M, which is an electric motor serving as a prime mover. The engine E includes a cylinder and a crankshaft Eb connected to a piston in the cylinder. The crankshaft Eb corresponds to an output shaft of the engine E. The crankshaft Eb is accommodated in a box-shaped crankcase 21. A left end portion of the crankshaft Eb protrudes from a left side wall 21a of the crankcase 21 to outside of the crankcase 21, and the protruding portion is covered by a generator cover 50 (hereinafter, simply referred to as a cover 50). A cowl 70 is disposed in front of the cover 50. A transmission 12 is disposed behind the engine E. The transmission 12 is accommodated in the crankcase 21.

Figure 2:
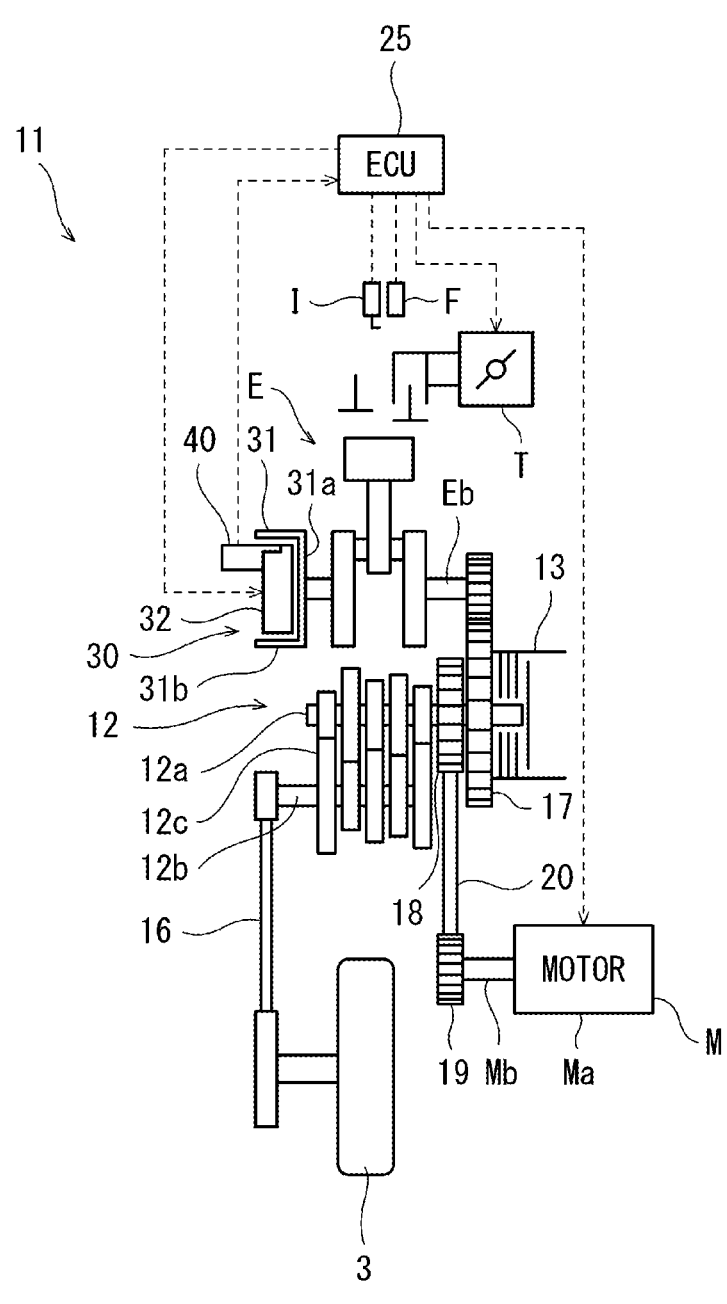
FIG. 2 is a schematic view illustrating a power system of the motorcycle in FIG. 1.

FIG. 2 is a schematic view illustrating a power system of the motorcycle 1 in FIG. 1. The transmission 12 includes an input shaft 12a, an output shaft 12b, and a plurality of sets of gear trains 12c having different reduction ratios. The transmission 12 is capable of transmitting power from the input shaft 12a to the output shaft 12b via the gear train 12c, and selects any set of the gear train 12c to shift. The input shaft 12a and the output shaft 12b are parallel to the crankshaft Eb and extend in the vehicle width direction of the motorcycle 1, that is, in the left-right direction. For example, the transmission 12 is a dog clutch type transmission. Rotational power of the output shaft 12b of the transmission 12 is transmitted to the rear wheel 3, which is a drive wheel, via an output transmission member 16. The output transmission member 16 is, for example, a chain, or a belt.

A right end portion of the crankshaft Eb of the engine E is connected to a primary gear 17 in a manner of being capable of transmitting power. The primary gear 17 is provided around the input shaft 12a between a main clutch 13 and the gear train 12c in an axial direction of the input shaft 12a. The primary gear 17 is rotatable with respect to the input shaft 12a. The primary gear 17 transmits rotational power from the crankshaft Eb to the main clutch 13. The primary gear 17 is connected to the input shaft 12a of the transmission 12 via the main clutch 13 in a manner of being capable of transmitting power. The main clutch 13 is provided at an end portion of the input shaft 12a, and cuts and connects a power path from the crankshaft Eb toward the input shaft 12a. The main clutch 13 is hydraulic driven. The main clutch 13 is, for example, a multi-plate clutch.

A sprocket 18, which is a rotating member that rotates together with the input shaft 12a about the input shaft 12a, is provided between the primary gear 17 and the gear train 12c. The drive motor M includes a motor housing Ma and a motor drive shaft Mb that protrudes from the motor housing Ma, and the motor drive shaft Mb is provided with a sprocket 19 in a manner that the sprocket 19 rotates together with the motor drive shaft Mb. A gear or a pulley may be used as a rotating member instead of the sprockets 18 and 19. A chain 20, which is a power transmission member, is connected to the sprocket 18 provided on the input shaft 12a and the sprocket 19 provided on the motor drive shaft Mb. Accordingly, a driving force of the drive motor M is transmitted to the input shaft 12a via the chain 20.

An electronic control unit (hereinafter, referred to as an "ECU") 25 controls the engine E. Specifically, the ECU 25 controls a throttle device T, a fuel injection device F, and an ignition device I. The ECU 25 controls an electric generator 30, which will be described later, as a starter motor based on a signal received from a sensor 40, which will be described later, to start the engine E.

The electric generator 30 is disposed in the vicinity of the left end portion of the crankshaft Eb of the engine E. The electric generator 30 includes a rotor 31 and a stator 32. The electric generator 30 generates electric power by rotation of the rotor 31. In the present embodiment, the electric generator 30 is an outer rotor type electric generator. In the present embodiment, the electric generator 30 is disposed adjacent to the engine E. Therefore, since the electric generator 30 is influenced by heat transferred from the engine E, which is an internal combustion engine, a temperature inside an accommodation chamber (an accommodation space S which will be described later) in which the electric generator 30 is accommodated is likely to become high.

The rotor 31 has a substantially bottomed cylindrical shape that is open leftward. The rotor 31 includes a bottom wall portion 31a and a peripheral wall portion 31b. The bottom wall portion 31a has a substantially disc shape or a substantially annular shape. The peripheral wall portion 31b has a substantially cylindrical shape that is connected to an outer peripheral edge portion of the bottom wall portion 31a. The peripheral wall portion 31b protrudes leftward from the bottom wall portion 31a. The crankshaft Eb is fixed to the bottom wall portion 31a of the rotor 31, and the rotor 31 rotates together with the crankshaft Eb. Rotation centers of the rotor 31 and the crankshaft Eb match a central axis of the peripheral wall portion 31b. A magnet is disposed on the peripheral wall portion 31b of the rotor 31. The stator 32 is disposed inside the peripheral wall portion 31b of the rotor 31 in a radial direction. The stator 32 and the peripheral wall portion 31b of the rotor 31 face each other in the radial direction.

The electric generator 30 is a so-called integrated starter generator (ISG) motor that also functions as a starter motor of the engine E. For example, the electric generator 30 may be a three-phase alternating-current motor. The sensor 40 for causing the electric generator 30 to function as a starter motor is disposed in the vicinity of the electric generator 30. In the present embodiment, the sensor 40 is attached to the stator 32. The sensor 40 detects a rotation position, that is, a rotation angle of the rotor 31. In the present embodiment, the sensor 40 is a magnetic sensor using a Hall effect, that is, a Hall sensor including a Hall IC. The sensor 40 is connected to the ECU 25 via a wiring. A control circuit for controlling the electric generator 30 can continue a rotation state of the rotor 31 by switching a flow path for supplying a current based on the rotation position of the rotor 31. Since the Hall sensor 40 is a magnetic sensor, a guaranteed temperature range for obtaining detection output is lower than that of other sensors.

Figure 3:
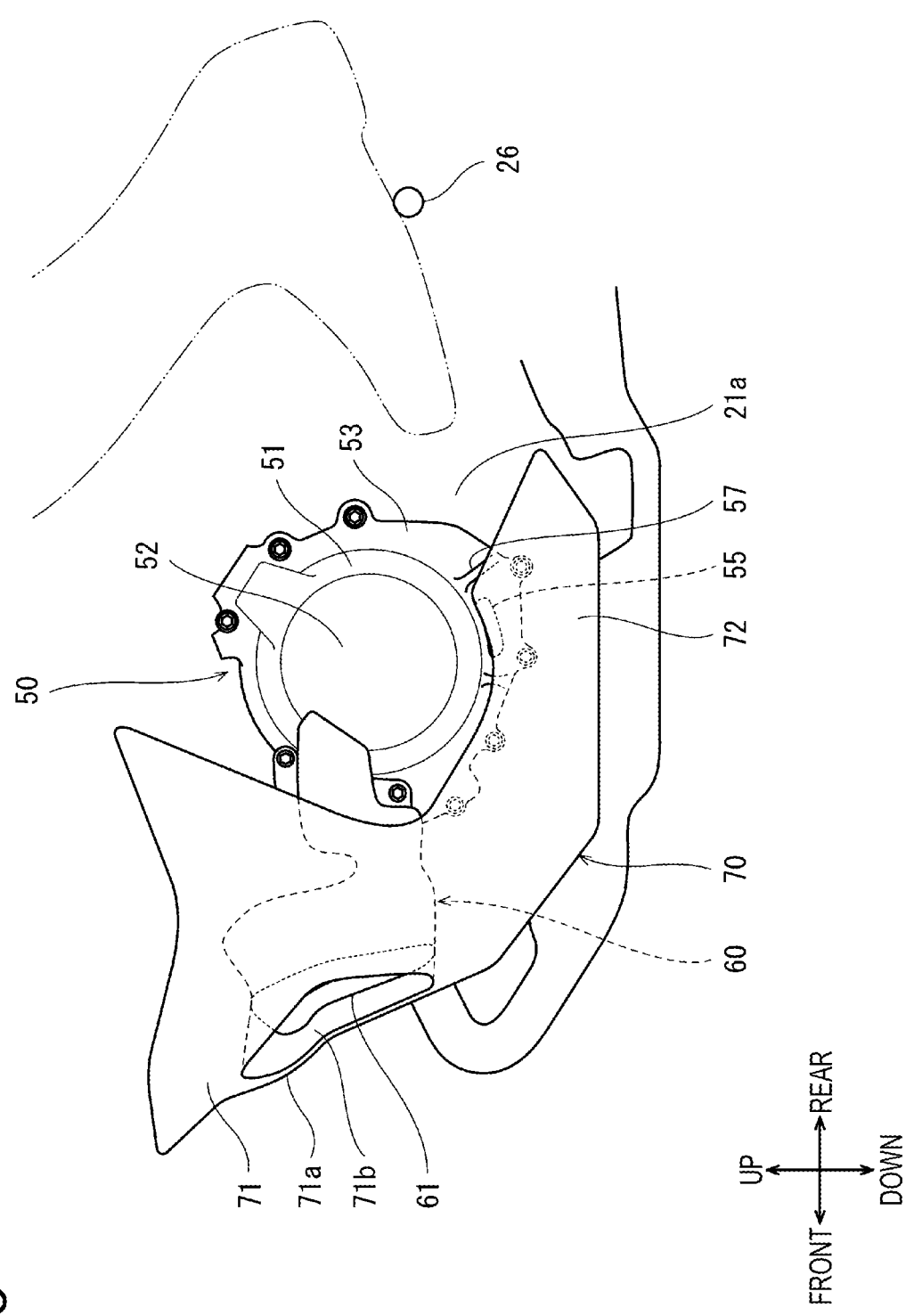
FIG. 3 is a partially enlarged left side view illustrating the motorcycle in FIG. 1.
Figure 4:
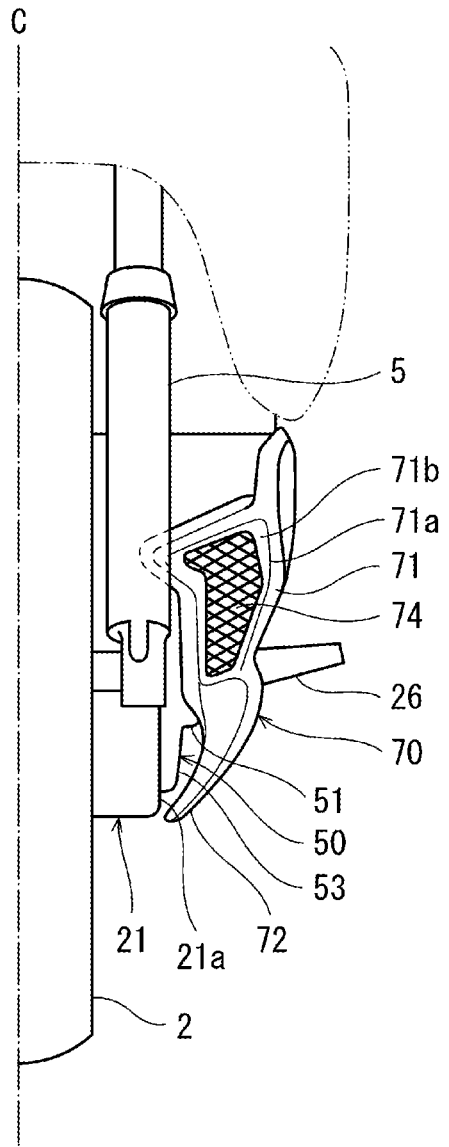
FIG. 4 is a partially enlarged front view illustrating the motorcycle in FIG. 1.
Figure 4:
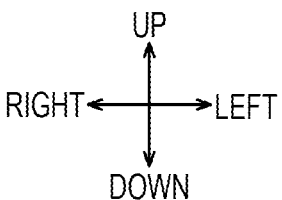
Figure 5:
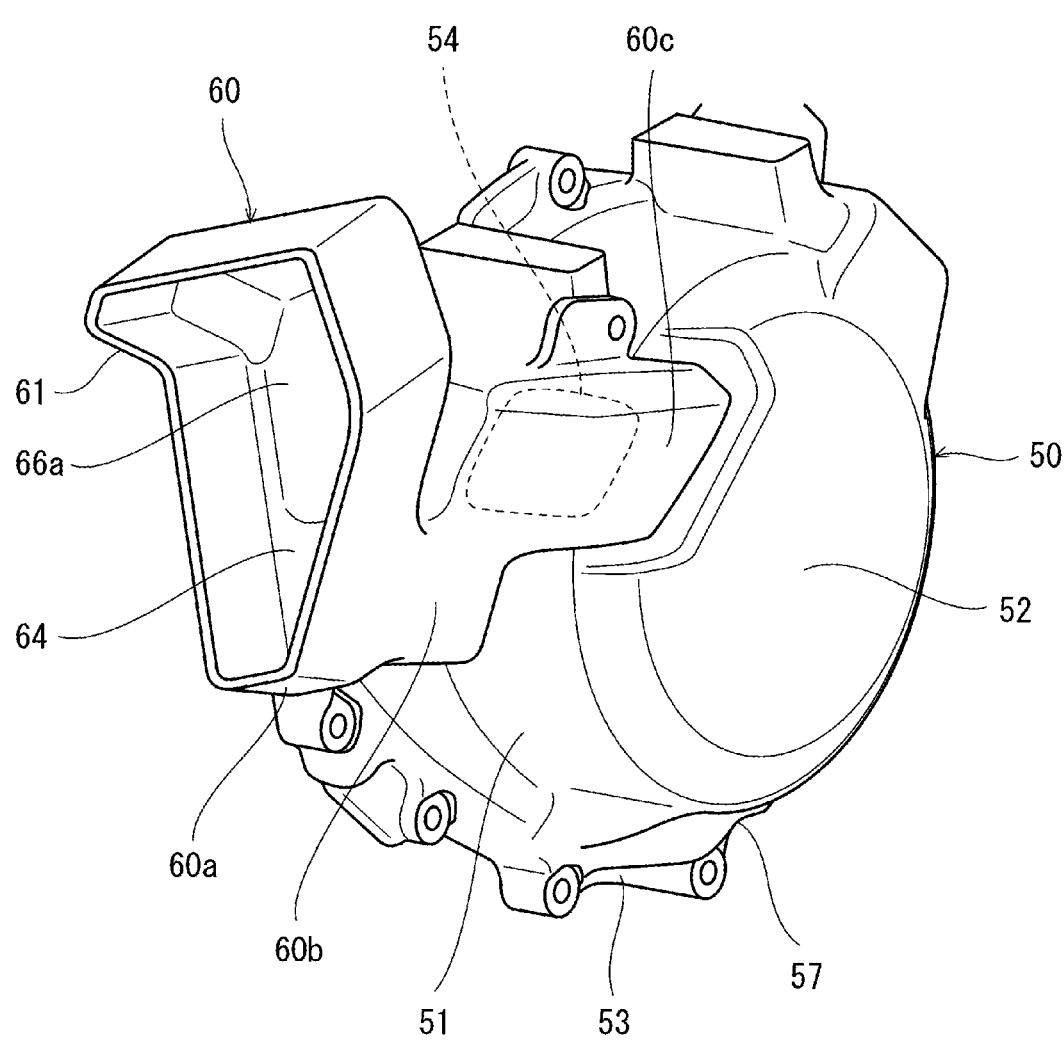
FIG. 5 is a partially enlarged perspective view illustrating the motorcycle in FIG. 1, as viewed from diagonally front left.
Figure 6:
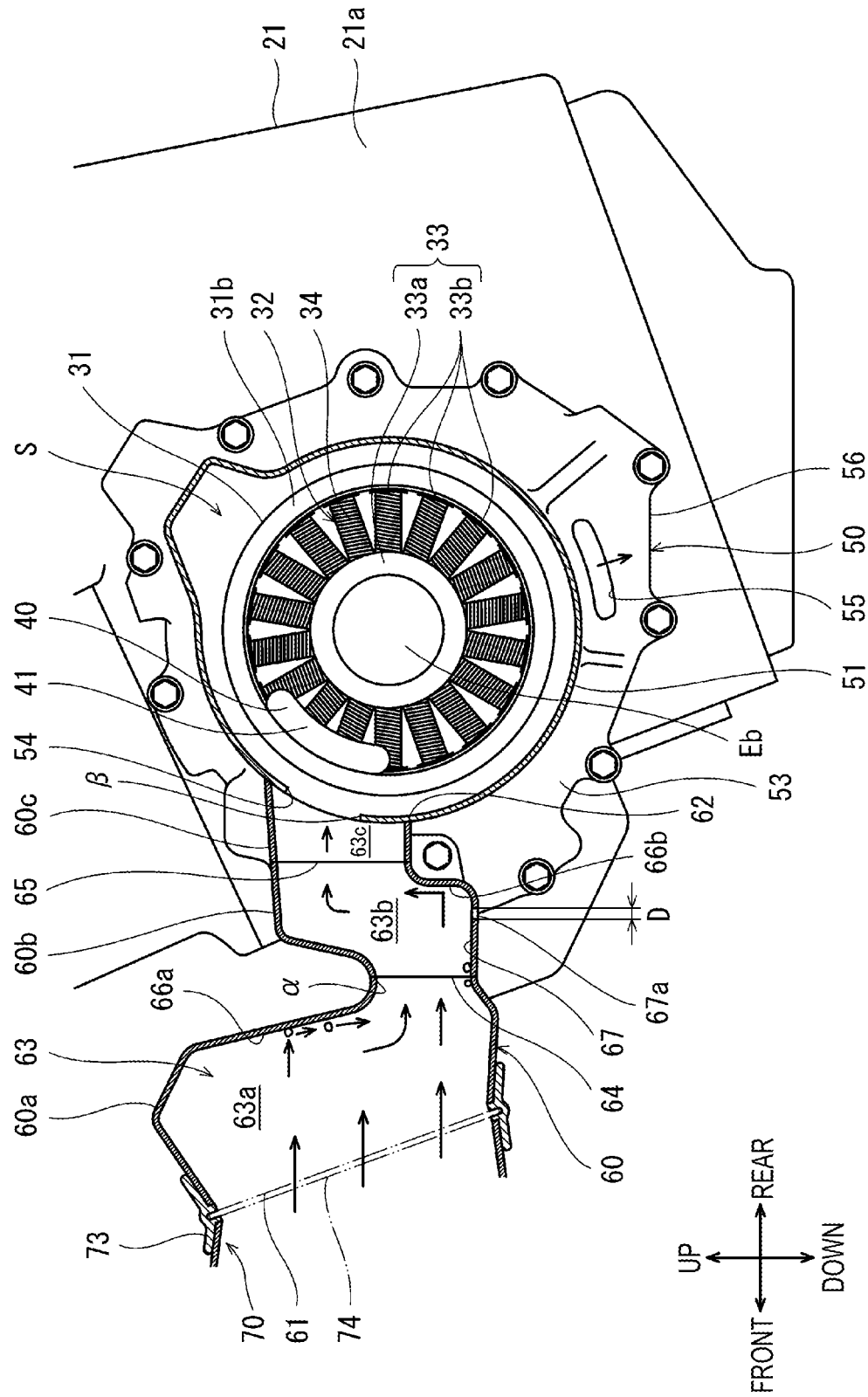
FIG. 6 is a partially enlarged left side cross-sectional view illustrating the motorcycle in FIG. 1.

FIG. 3 is a partially enlarged left side view illustrating the motorcycle 1 in FIG. 1. FIG. 4 is a partially enlarged front view illustrating the motorcycle in FIG. 1. FIG. 5 is a partially enlarged perspective view illustrating the motorcycle in FIG. 1, as viewed from diagonally front left. FIG. 6 is a partially enlarged left side cross-sectional view illustrating the motorcycle in FIG. 1, which is obtained by cutting perpendicularly to the left-right direction to make it easier to understand spaces inside a duct 60 which will be described later and the cover 50. FIGS. 5 and 6 are partially enlarged side cross-sectional views illustrating the motorcycle 1 in FIG. 1. In FIGS. 5 and 6, some elements such as the cowl 70 and wirings connected to the sensor 40 are omitted.

The cover 50 is attached to the left side wall 21*a* of the crankcase 21. The cover 50 covers the electric generator 30 disposed outside the crankcase 21 from left. The accommodation space S in which the electric generator 30 and the sensor 40 are accommodated is defined by the left side wall 21*a* of the crankcase 21 and the cover 50.

More specifically, as illustrated in FIG. 6, the rotor 31 of the electric generator 30 is fixed to the left end portion of the crankshaft Eb outside the crankcase 21. The stator 32 is fixed to a surface of the cover 50 that faces the inner side in the vehicle width direction. The stator 32 includes a stator core 33. As illustrated in FIG. 6, the stator core 33 includes an annular base portion 33*a* and a plurality of tooth portions 33*b* protruding radially from the base portion 33*a*. The plurality of tooth portions 33*b* are provided at intervals in a circumferential direction. The stator 32 is formed by winding a coil 34 around each tooth portion 33*b* of the stator core 33. When the cover 50 is attached to the crankcase 21, the stator 32 is disposed in a manner of facing the rotor 31, and in more detail, in a manner of facing the peripheral wall portion 31*b* of the rotor 31 in the radial direction.

The sensor 40 is fixed to some tooth portions 33*b* of the plurality of tooth portions 33*b* of the stator 32. Specifically, the sensor 40 includes a main body portion 41 and a plurality of engagement portions 42 protruding rightward from the main body portion 41 and engaged with the stator 32 (see FIG. 9). The main body portion 41 is formed in an arc shape extending in the circumferential direction. The main body portion 41 includes a housing that has an arc-shape extending in the circumferential direction, and electronic components such as Hall ICs are accommodated in the housing. An upper surface of the main body portion 41 and distal end portions of the tooth portions 33*b* are generally on the same arc curve in the side view. The wiring extending from the ECU 25 is connected to the main body portion 41.

In the present embodiment, the motorcycle 1 includes a cooling structure for cooling the electric generator 30 and the sensor 40, which are electrical components accommodated in the accommodation space S. The cooling structure introduces traveling wind during traveling of the motorcycle 1 into the accommodation space S, and cools the electric generator 30 and the sensor 40 with the introduced traveling wind. Hereinafter, the cooling structure will be described in detail with reference to FIGS. 3 to 9. The cooling structure includes the duct 60 and the cowl 70 in addition to the cover 50 described above.

Figure 7:
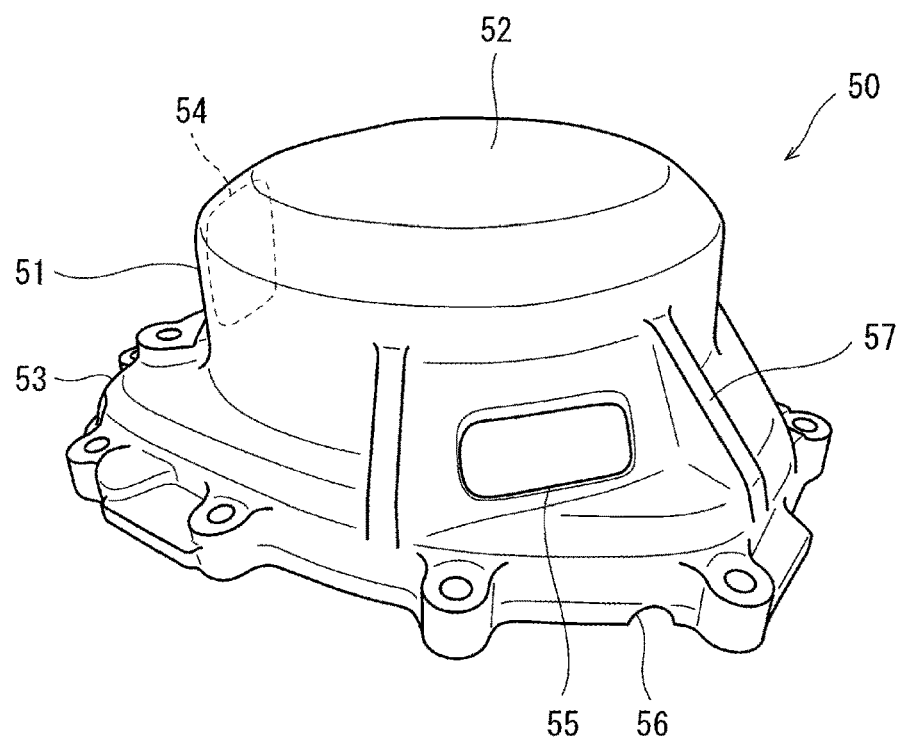
FIG. 7 is a perspective view illustrating a cover.

FIG. 7 is a perspective view illustrating the cover 50. The cover 50 has a concave shape that is open rightward in a state in which the cover 50 is attached to the motorcycle 1. The cover 50 includes a substantially cylindrical-shaped cover peripheral wall 51, a substantially disk-shaped cover side wall 52 that closes one end portion of the cover peripheral wall 51, and a flange 53 that expands outward from the other end portion of the cover peripheral wall 51 in the radial direction. The cover 50 is fixed to the crankcase 21 by bolts penetrating the flange 53.

An outer side of the accommodation space S in the radial direction centered on an axial line of the crankshaft Eb is defined by the cover peripheral wall 51. The cover side wall 52 closes one opening of the cover peripheral wall 51 and covers the accommodation space S from the outer side in the vehicle width direction. That is, the outer side of the accommodation space S in the vehicle width direction is defined by the cover side wall 52.

A cover inlet 54 is formed in a portion of the cover peripheral wall 51 that covers the accommodation space S from front (also referred to as a "cover front wall"). The cover inlet 54 faces forward. The cover inlet 54 is an opening for introducing air into the accommodation space S. The cover inlet 54 has a substantially rectangular shape. The cover inlet 54 is positioned below an upper end portion of the rotor 31. Therefore, the cover inlet 54 is disposed below the cylinder of the engine E.

A cover outlet 55 is formed in a portion of the cover peripheral wall 51 that covers the accommodation space S from below (also referred to as a "cover lower wall"). The cover outlet 55 is an opening for discharging air from the accommodation space S. The cover outlet 55 has a substantially rectangular shape extending in the circumferential direction.

Traveling wind is introduced into the accommodation space S from the cover inlet 54, and the electric generator 30 and the sensor 40 are cooled by the introduced traveling wind. Thereafter, the traveling wind heated by heat transferred from the electric generator 30 and the sensor 40 in the accommodation space S is discharged from the accommodation space S through the cover outlet 55.

As illustrated in FIG. 5, the duct 60 is connected to the cover 50. Specifically, the duct 60 is fixed to the cover 50 by fixing sections such as bolts. The duct 60 is positioned in front of the cover 50 to guide traveling wind to the cover inlet 54 on the cover front wall.

In a front view, the duct 60 overlaps the cover 50. The duct 60 is disposed on the inner side in the vehicle width direction relative to the end portion of the cover 50 on the outer side in the vehicle width direction, that is, the duct 60 is disposed on the inner side in the vehicle width direction relative to the cover side wall 52. As illustrated in FIG. 6, a lower end portion of the duct 60 is positioned below upper end portions of the accommodation space S and the cover peripheral wall 51.

The duct 60 includes a duct inlet 61, a duct outlet 62, and a duct flow path 63 that guides air flowing from the duct inlet 61 to the duct outlet 62. The duct inlet 61 faces forward. The duct inlet 61 is disposed in front of the duct outlet 62 and the cover inlet 54. The duct inlet 61 is positioned at a front end portion of the duct 60. The duct outlet 62 faces rearward and communicates with the cover inlet 54. The duct outlet 62 is positioned at a rear end portion of the duct 60.

As illustrated in FIG. 3, the duct 60 is covered by the cowl 70. The cowl 70 has a concave shape. The cowl 70 is directly fixed to or indirectly fixed to the crankcase 21, the cover 50, the duct 60, or the like via a bracket or the like.

The cowl 70 includes a front cowl portion 71 and a lower cowl portion 72 that extends rearward from a lower end portion of the front cowl portion 71. The front cowl portion 71 covers the duct 60 from front. The front cowl portion 71 also covers the duct 60 from left. The lower cowl portion 72 covers the duct 60 and the cover 50 from below. By covering the duct 60 by the cowl 70 in this manner, aesthetic appearance of the motorcycle 1 can be improved.

The cowl 70 includes a cowl opening 71a disposed in front of the duct inlet 61, and a cylindrical guide portion 71b extending rearward from a peripheral portion of the cowl opening 71a toward a peripheral portion of the duct inlet 61. The cowl opening 71a has substantially the same shape as the duct inlet 61, and is slightly larger than the duct inlet 61. A rear end portion of the guide portion 71b and the duct inlet 61 are connected to each other via an annular elastic seal 73.

Figure 8:
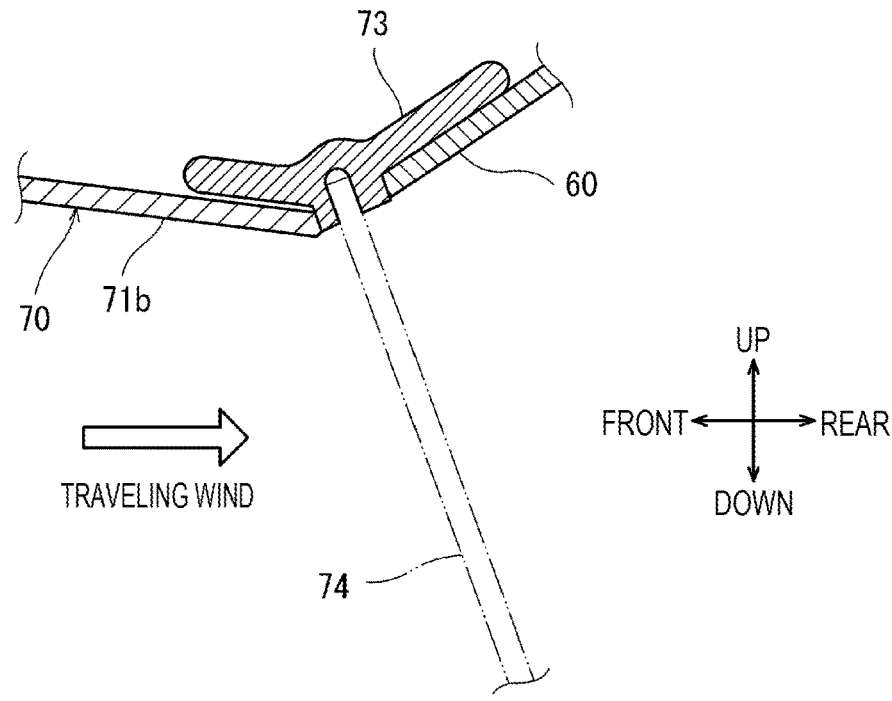
FIG. 8 is an enlarged cross-sectional view illustrating a connection portion between a guide portion of a cowl and a duct.

FIG. 8 is an enlarged cross-sectional view illustrating a connection portion between the guide portion 71b of the cowl 70 and the duct 60. In this example, the rear end portion of the guide portion 71b has the same shape and the same size as the front end portion of the duct 60 at which the duct inlet 61 is formed. The annular elastic seal 73 is sandwiched between the rear end portion of the guide portion 71b and the front end portion of the duct 60 in the front-rear direction. The elastic seal 73 is configured to hold a screen 74 between the rear end portion of the guide portion 71b and the front end portion of the duct 60. The screen 74 is a mesh structure that allows air to pass therethrough and prevents passage of an object larger than a predetermined size. For example, the screen 74 is a wire mesh. The screen 74 prevents large dust or the like from entering the duct 60. Since the rear end portion of the cylindrical guide portion 71b and the front end portion of the duct 60 are connected to each other, traveling wind passed through the cowl opening 71a can be guided to the duct inlet 61 without leakage.

As illustrated in FIG. 5, a dimension in the left-right direction of a portion of the duct inlet 61, which is below a center in a vertical direction, decreases as the duct inlet 61 extends downward. As illustrated in FIG. 4, a dimension in the left-right direction of a portion of the front cowl portion 71, which is below a center in the vertical direction, decreases as the front cowl portion 71 extends downward.

In the present embodiment, the duct 60 and the cover 50 form a labyrinth structure that guides air passed through the duct inlet 61 to the cover inlet 54 while changing a direction of the flow of air in the duct flow path 63 a plurality of times. A specific configuration of the duct 60 will be described with reference to FIG. 6.

In FIG. 6, directions in which air flows in the duct flow path 63 are indicated by arrows. In the following description, a side close to the duct inlet 61 in a direction along the flow of air in the duct flow path 63 is referred to as "upstream", and a side close to the duct outlet 62 in the direction along the flow of air in the duct flow path 63 is referred to as "downstream".

The duct 60 includes an inlet duct portion 60a, a deflection duct portion 60b, and an outlet duct portion 60c. The inlet duct portion 60a, the deflection duct portion 60b, and the outlet duct portion 60c are connected in this order in a flow direction of air from the duct inlet 61 to the duct outlet 62. That is, the duct inlet 61 is formed by an upstream end portion of the inlet duct portion 60a. An opening 64 at a downstream end portion of the inlet duct portion 60a is connected to an opening at an upstream end portion of the deflection duct portion 60b. An opening 65 at a downstream end portion of the deflection duct portion 60b is connected to an opening at an upstream end portion of the outlet duct portion 60c. The duct outlet 62 is formed by a downstream end portion of the outlet duct portion 60c.

The duct flow path 63 includes an inlet flow path 63a, a deflection flow path 63b, and an outlet flow path 63c. The inlet flow path 63a is a flow path defined by the inlet duct portion 60a, the deflection flow path 63b is a flow path defined by the deflection duct portion 60b, and the outlet flow path 63c is a flow path defined by the outlet duct portion 60c. The inlet flow path 63a, the deflection flow path 63b, and the outlet flow path 63c are connected in this order in the flow direction of air from the duct inlet 61 to the duct outlet 62.

The inlet duct portion 60a, the deflection duct portion 60b, and the outlet duct portion 60c are only called separately to make it easier to describe functions of each portion of duct 60, and the inlet duct portion 60a, the deflection duct portion 60b, and the outlet duct portion 60c may not be separate members. Two or more of the inlet duct portion 60a, the deflection duct portion 60b, and the outlet duct portion 60c may be integrally formed with each other. The inlet duct portion 60a, the deflection duct portion 60b, and the outlet duct portion 60c may be an assembly of a plurality of members.

An area of the opening 64 at the downstream end portion of the inlet duct portion 60a is smaller than an area of the duct inlet 61, which is an opening at the upstream end portion of the inlet duct portion 60a. For example, the area of the opening 64 in the front view is equal to or less than half the area of the duct inlet 61 in the front view. The inlet duct portion 60a is positioned above the opening 64 at the downstream end portion of the inlet duct portion 60a, and includes a first deflection wall 66a facing the inlet flow path 63a.

In the front view, the opening 64 at the downstream end portion of the inlet duct portion 60a overlaps a lower portion of the duct inlet 61 (see also FIG. 5). In the front view, the first deflection wall 66a overlaps an upper portion of the duct inlet 61.

The first deflection wall 66a faces forward. The first deflection wall 66a is gradually inclined rearward as the first deflection wall 66a extends downward. The first deflection wall 66a deflects the flow of air in the duct flow path 63 downward. Specifically, air that passes through the duct inlet 61 and collides with the first deflection wall 66a is guided downward by the first deflection wall 66a. The air guided by the first deflection wall 66a flows into the deflection flow path 63b through the opening 64 positioned below the first deflection wall 66a.

In this way, the inlet flow path 63a becomes narrower toward the downstream. In other words, a flow path cross-sectional area of the inlet flow path 63a decreases toward the downstream in the flow direction. Therefore, the inlet duct portion 60a restricts the flow of air in the inlet flow path 63a, and makes a flow speed of air passing through the opening 64 faster than a flow speed of air passing through the duct inlet 61. Therefore, the inlet duct portion 60a may also be referred to as a restriction portion. The inlet flow path 63a may also be referred to as a restriction flow path.

In the front view, an area of the opening 65 at the downstream end portion of the deflection duct portion 60b is substantially the same as the area of the opening 64 at the downstream end portion of the inlet duct portion 60a. The opening 65 at the downstream end portion of the deflection duct portion 60*b* is positioned at a position slightly shifted upward with respect to the opening 64 at the downstream end portion of the inlet duct portion 60*a*. The deflection duct portion 60*b* includes a second deflection wall 66*b*. The second deflection wall 66*b* is positioned below the opening 65 at the downstream end portion of the deflection duct portion 60*b* and faces the deflection flow path 63*b*.

The second deflection wall 66*b* faces forward. An area of the second deflection wall 66*b* in the front view is smaller than an area of the first deflection wall 66*a* in the front view. The second deflection wall 66*b* is disposed at a position overlapping the duct inlet 61 in the front view. In the front view, the second deflection wall 66*b* is positioned at a position at which the entire second deflection wall 66*b* is visible through the duct inlet 61.

The second deflection wall 66*b* deflects the flow of air in the duct flow path 63 upward. Specifically, air that passes through the opening 64 and collides with the second deflection wall 66*b* is guided upward by the second deflection wall 66*b*, and then is guided rearward by an upper wall constituting an upper portion of the deflection duct portion 60*b*, and flows into the outlet flow path 63*c* through the opening 65 positioned above the second deflection wall 66*b*.

A wall 67 connected to a lower end portion of the second deflection wall 66*b* in the deflection duct portion 60*b* has a through hole 67*a* penetrating in the up-down direction. The through hole 67*a* is a hole for discharging a foreign object included in traveling wind to outside of the duct 60. Hereinafter, the wall 67 may also be referred to as a discharge wall 67. The discharge wall 67 is provided in a lower portion of the deflection duct portion 60*b*. The discharge wall 67 is positioned upstream of the second deflection wall 66*b* in the flow direction. An area of the through hole 67*a* is formed in a shape that allows the foreign object to pass through. For example, a diameter D of the through hole 67*a* may be 3 mm or more.

By colliding with the second deflection wall 66*b*, the foreign object included in traveling wind is separated from the traveling wind and falls downward to the position of the discharge wall 67. The foreign object falling downward is discharged from the through hole 67*a* to the outside of the duct 60. In this way, the traveling wind and the foreign object heavier than the traveling wind (for example, a substance having a density higher than that of air such as water or sand) are separated by the second deflection wall 66*b*, and the foreign object can be discharged from the through hole 67*a* to the outside of the duct 60. Accordingly, the foreign object can be prevented from entering the accommodation space S. Therefore, the deflection duct portion 60*b* may also be referred to as a separation portion. The deflection flow path 63*b* may also be referred to as a separation flow path. In other words, the deflection flow path 63*b* has a function of reducing a moving speed of the foreign object compared with the traveling wind.

The outlet duct portion 60*c* has a tubular shape extending in the front-rear direction. In the front view, an area of the duct outlet 62 is substantially the same as the area of the opening 65 at the downstream end portion of the deflection duct portion 60*b*. The area of the duct outlet 62 is smaller than the area of the duct inlet 61. The area of the duct outlet 62 is larger than an area of the cover inlet 54, and the downstream end portion of the outlet duct portion 60*c* is connected to the cover front wall in a manner that the duct outlet 62 contains the cover inlet 54 in the front view. However, the area of the duct outlet 62 may be the same as the area of the duct inlet 61. The area of the duct outlet 62 may be the same as the area of the cover inlet 54.

A lower wall of the outlet duct portion 60*c* is positioned downstream of the second deflection wall 66*b* in the flow direction and is connected to an upper end portion of the second deflection wall 66*b*. An upper wall of the outlet duct portion 60*c* is connected to an upper wall of the deflection duct portion 60*b*.

The outlet flow path 63*c* is positioned downstream of the second deflection wall 66*b* in the flow direction of air and extends toward the duct outlet 62. The outlet flow path 63*c* extends in the front-rear direction.

The duct inlet 61, the first deflection wall 66*a*, and the cover inlet 54 are arranged in the front-rear direction in a manner that the entire cover inlet 54 overlaps the duct inlet 61 and overlaps the first deflection wall 66*a* in the front view. In other words, even when viewing the inside of the duct 60 through the duct inlet 61 from front, the cover inlet 54 is invisible due to the first deflection wall 66*a* positioned in front of the cover inlet 54. The cover inlet 54 is disposed in a manner of being shifted in a direction perpendicular to the front-rear direction with respect to the second deflection wall 66*b* so as not to overlap the second deflection wall 66*b* in the front view. For example, as illustrated in FIG. 6, the cover inlet 54 is disposed in a manner of being shifted in the up-down direction with respect to the second deflection wall 66*b*.

In the accommodation space S, the rotor 31 and the sensor 40 are disposed in a manner that air flowing into the accommodation space S from the cover inlet 54 directly hits the rotor 31 and the sensor 40. Specifically, the rotor 31 and the sensor 40 in the accommodation space S are disposed in a manner of facing the cover inlet 54 in an extending direction of the outlet flow path 63*c*.

Figure 9:
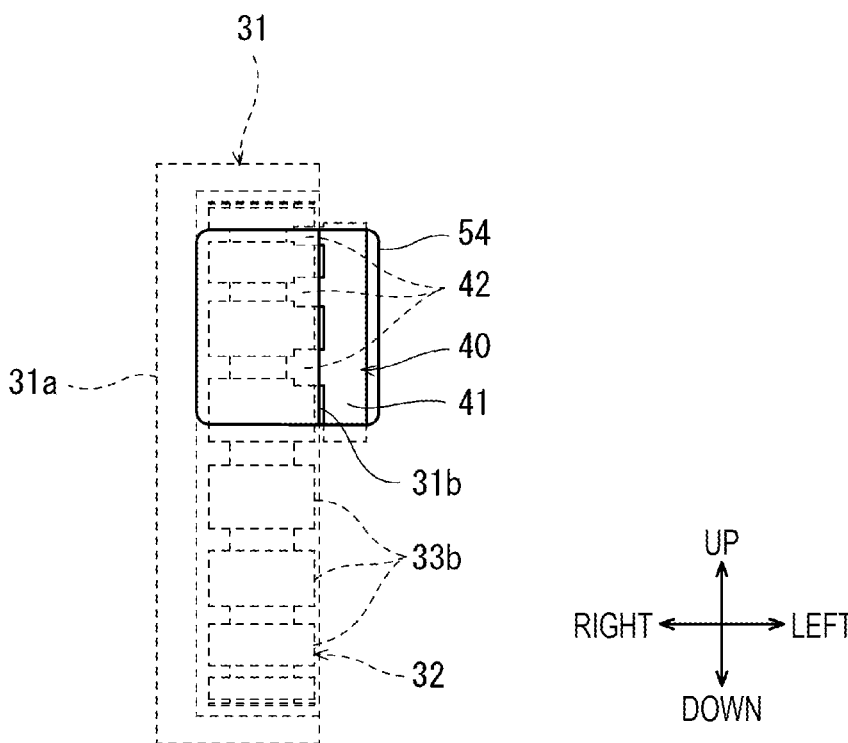
FIG. 9 is a view illustrating a cover inlet as viewed in an extending direction of an outlet flow path.

FIG. 9 is a view illustrating the cover inlet 54 as viewed in the extending direction of the outlet flow path 63*c*, that is, in the front-rear direction. When viewing in the extending direction of the outlet flow path 63*c*, a part of a surface of the rotor 31 on the outer side in the radial direction and the main body portion 41 of the sensor 40 are arranged in a manner of being visible through the cover inlet 54. The sensor 40 is disposed in a manner of facing the cover inlet 54 in the front-rear direction. The sensor 40 is disposed above the rotation center of the crankshaft Eb.

In FIG. 9, the stator 32 positioned inside the rotor 31 in the radial direction is indicated by a broken line. As illustrated in FIG. 9, each engagement portion 42 of the sensor 40 protrudes rightward from the main body portion 41 and is fitted between two adjacent tooth portions 33*b*. A portion of the engagement portion 42 that entered between the two tooth portions 33*b* faces the peripheral wall portion 31*b* of the rotor 31 in the radial direction together with the stator 32. Meanwhile, the main body portion 41 does not face the peripheral wall portion 31*b* in the radial direction. The main body portion 41 is positioned outside the peripheral wall portion 31*b* of the rotor 31. However, a part of the main body portion 41 may face the peripheral wall portion 31*b* in the radial direction.

As illustrated in FIG. 6, the cover 50 has a foreign object discharge hole 56 disposed at a lowermost end of the accommodation space S. The foreign object discharge hole 56 is defined by the left side wall 21*a* of the crankcase 21 and an outer peripheral edge of the cover 50. Specifically, the foreign object discharge hole 56 is a notch formed on the outer peripheral edge of the cover 50 (see FIG. 7). An area of the foreign object discharge hole 56 is smaller than an area of the cover outlet 55. The foreign object discharge hole 56 is positioned below the cover outlet 55. Therefore, even when a foreign object (for example, water or sand) enters the accommodation space S and the foreign object is not discharged from the cover outlet 55, the foreign object can be discharged from the foreign object discharge hole 56. That is, accumulation of a foreign object in the accommodation space S can be prevented.

Air flowing into the accommodation space S through the cover inlet 54 cools the electrical components in the accommodation space S and then is discharged from the cover outlet 55. The cover outlet 55 is positioned rearward relative to the center of the crankshaft Eb.

As illustrated in FIG. 3, the cover outlet 55 is covered by the lower cowl portion 72 from left and below. Therefore, by the lower cowl portion 72, water or mud splashed during vehicle travelling can be prevented from entering the accommodation space through the cover outlet. A gap between an upper end portion of the lower cowl portion 72 and the cover 50 has a size that does not allow a human finger to enter. Therefore, it is possible to prevent a person from erroneously inserting a finger through the cover outlet 55.

The motorcycle 1 includes footsteps 26 that support feet of the rider from below during traveling. As illustrated in FIG. 3, the footstep 26 is disposed behind the cover outlet 55. Therefore, there is a possibility that heated air discharged from the cover outlet 55 flows toward the foot of the rider placed on the footstep 26. In the present embodiment, the cover outlet 55 is disposed below the footstep 26. Therefore, the heated air discharged from the cover outlet 55 can be prevented from flowing toward the foot of the rider placed on the footstep 26.

Further, the cover 50 includes a rib 57 between the cover outlet 55 and the footstep in the front-rear direction. The rib 57 protrudes downward from the cover lower wall (see also FIG. 7). The rib 57 overlaps the cover outlet 55 when viewed in the front-rear direction. Accordingly, the air discharged from the cover outlet 55 can be prevented from flowing rearward and upward by the rib 57, and as a result, the air can be prevented from flowing toward the foot of the rider placed on the footstep 26. The rib 57 may be provided on a separate member such as the cowl 70 or the crankcase 21 instead of the cover 50.

As described above, in the motorcycle 1 according to the present embodiment, traveling wind passing through the duct 60 is directed to the accommodation space S by changing the direction of the traveling wind by the first deflection wall 66a and the second deflection wall 66b. A foreign object included in traveling wind collides with the first deflection wall 66a and the second deflection wall 66b together with the traveling wind. The foreign object has an inertia larger than the traveling wind. Therefore, a speed of the foreign object after the collision is reduced as compared with the traveling wind. The traveling wind flowing into the accommodation space S from the cover inlet 54 collides with the electric generator 30 and the sensor 40, which are electrical components positioned on an extension line of the outlet flow path 63c. In this way, traveling wind having a flow speed close to a flow speed at the time of entering the cover 50 collides with the electrical components, and a cooling effect to the electrical components can be enhanced. Since the foreign object collides with the first deflection wall 66a and the second deflection wall 66b, the speed of the foreign object is reduced, and even if the foreign object enters the cover 50, an impact when the foreign object collides with the electrical components can be alleviated. Accordingly, an influence of the entry of the foreign object into the cover 50 can be reduced.

According to the present embodiment, the foreign object included in the traveling wind collides with the second deflection wall 66b, thereby being separated from the traveling wind and falling downward. The foreign object falling downward is discharged from the through hole 67a to the outside of the duct 60. In this way, the traveling wind and foreign object (for example, water or sand) heavier than the traveling wind can be separated by the second deflection wall 66b, and the foreign object can be discharged from the through hole 67a to the outside of the duct 60. Accordingly, the foreign object can be prevented from entering the accommodation space S.

According to the present embodiment, the first deflection wall 66a and the second deflection wall 66b deflect the flow of air in the duct flow path 63 in the up-down direction. Therefore, a size of the duct 60 in the vehicle width direction can be reduced as compared with a duct including a deflection wall that deflects the flow of air in the duct flow path 63 in the vehicle width direction.

According to the present embodiment, since the outlet duct portion 60c that defines the outlet flow path 63c is connected to the second deflection wall 66b, the traveling wind deflected by the second deflection wall 66b immediately enters the outlet flow path 63c. Therefore, the duct 60 can be made compact in the front-rear direction.

According to the present embodiment, since the duct 60 is disposed on the inner side in the vehicle width direction relative to the cover side wall 52, an increase in a size of the motorcycle 1 in the vehicle width direction can be prevented by the cover 50.

According to the present embodiment, the duct inlet 61, the first deflection wall 66a, and the cover inlet 54 are arranged in the front-rear direction in a manner that the entire cover inlet 54 overlaps the duct inlet 61 and overlaps the first deflection wall 66a in the front view. Therefore, a foreign object passed through the duct inlet 61 from front to rear can be prevented from directly entering the accommodation space S by the first deflection wall 66a.

According to the present embodiment, since the duct 60 includes a plurality of deflection walls such as the first deflection wall 66a and the second deflection wall 66b, an effect of reducing the speed of the foreign object entered the duct 60 is enhanced.

The cover inlet 54 and the duct inlet 61 are positioned, for example, below an upper end of the front wheel 2 and an upper end of the rear wheel 3. More specifically, the cover inlet 54 is positioned below the upper end of the rotor 31. Therefore, as compared with a case in which the inlet is disposed at a high position, it is easier for the foreign object to enter the inlet. The foreign object is assumed to be a small stone or sand that is repelled by the front wheel 2 or lifted from a road surface, for example. According to the present embodiment, as described above, by forming the deflection walls 66a and 66b, it is possible to prevent the influence of the collision of the foreign object to the electric generator 30 and the sensor 40, which are electrical components in the accommodation space S. Accordingly, the inlets are not disposed at undesirably high positions, and an increase in dimensions of the cover 50 and the duct 60 in the up-down direction can be prevented. The cover inlet 54 and the duct inlet 61 may be positioned below an axle of the front wheel 2 and an axle of the rear wheel 3.

The labyrinth structure formed by the duct 60 and the cover 50 is implemented in a manner that the entire cover inlet 54 overlaps a wall portion of the duct 60 positioned in front of the cover inlet 54 in the front view. For example, in the labyrinth structure that forms the flow path from the duct inlet 61 to the cover inlet 54, when a portion positioned above the flow path is referred to as an upper wall and a portion positioned below the flow path is referred to as a lower wall, an upper end β of the lower wall is positioned above a lower end α of the upper wall (see FIG. 6). Accordingly, the traveling wind can be easily prevented from directly passing through the cover inlet 54.

According to the present embodiment, by deflecting the flow of air upward and downward by the labyrinth structure, an increase in size in the vehicle width direction can be prevented for a duct shape. Accordingly, the duct 60 can be prevented from coming into contact with the road surface at the time of overturning.

Other Embodiments

The present disclosure is not limited to the embodiment described above, and the configuration may be changed, added, or deleted.

For example, in the above embodiment, the duct 60 has one through hole 67a, but the duct may have a plurality of through holes penetrating in the up-down direction. The through hole may be formed on, for example, a lower wall constituting the lower end portion of the inlet duct portion 60a. As the labyrinth structure, in addition to a configuration in which the flow of air is deflected in the up-down direction, a structure in which the flow of air is deflected in the left-right direction may be employed.

The shape, the position, or the configuration of the duct, the cover, or the cowl is not limited to those described in the above embodiment. The duct may not be positioned in front of the cover, and may be disposed at another position such as above the cover. For example, in the cowl 70, the front cowl portion 71 and the lower cowl portion 72 are integrated, but the front cowl portion 71 and the lower cowl portion 72 may be separate members.

In the above embodiment, the rotor 31 and the sensor 40 are disposed in a manner that air flowing into the accommodation space S from the cover inlet 54 directly hits the rotor 31 and the sensor 40, but only one of the rotor 31 and the sensor 40 may be disposed in a manner that air flowing into the accommodation space S from the cover inlet 54 directly hits the one of the rotor 31 and the sensor 40.

In the above embodiment, the electric generator 30 is disposed at the left end portion of the crankshaft Eb of the engine E, but the electric generator may be disposed at the right end portion of the crankshaft of the engine.

The sensor may not include a facing portion that faces the rotor in the radial direction. For example, the sensor is fixed to the stator in the above embodiment, but the sensor may not be fixed to the stator. The sensor may be fixed to an inner surface of the cover.

In the above embodiment, the electric generator is of the outer rotor type, but the electric generator may be of an inner rotor type.

In the above embodiment, the Hall sensor including the Hall IC is exemplified as the sensor for detecting the rotation angle of the rotor, but the sensor for detecting the rotation angle of the rotor, that is, the sensor that is to be cooled by a coolant flow path may be another type of sensor, such as a magnetic sensor of another type or a resolver type sensor.

In the above embodiment, the motorcycle is a hybrid vehicle, but may be a vehicle using only an engine as the travel driving source. That is, the engine unit may not include the drive motor M. In addition, a straddle-type vehicle including the engine unit is not limited to the motorcycle, and may be a motor tricycle or the like. For example, in a vehicle including an ISG motor for idling stop, the cooling structure according to the present embodiment can be applied to cool a Hall IC sensor for detecting a rotor position. Similarly, the cooling structure according to the present embodiment can be applied to cool a Hall IC sensor incorporated in a crankcase.

DISCLOSURE

Each of the following aspects is a disclosure of a preferred embodiment.

Aspect 1

According to an aspect of the present disclosure, a vehicle includes: a vehicle body frame; an electrical component supported on the vehicle body frame; a cover that defines an accommodation space in which the electrical component is accommodated, the cover including a cover inlet configured to introduce air into the accommodation space, and a cover outlet configured to discharge air from the accommodation space; and a duct connected to the cover, the duct including a duct inlet facing forward in a traveling direction, a duct outlet communicating with the cover inlet, a duct flow path configured to guide air flowing from the duct inlet to the duct outlet, and at least one deflection wall configured to deflect a flow of air inside the duct flow path. The duct flow path includes an outlet flow path that is a flow path positioned on a downstream side of the deflection wall in a flow direction of air and extending toward the duct outlet, and the electrical component is disposed to face the cover inlet in an extending direction of the outlet flow path.

According to the above aspect, the traveling wind passing through the duct is directed to the accommodation space by changing the direction of the traveling wind by the deflection wall. The foreign object included in the traveling wind collides with the deflection wall together with the traveling wind. The foreign object is a small stone, sand, or the like, and has a density higher than that of air, and thus has an inertia mass larger than that of the traveling wind. Therefore, the speed of the foreign object after the collision is reduced as compared with the traveling wind due to the influence of the collision. The traveling wind flowing into the accommodation space from the cover inlet collides with the electrical components positioned on the extension line of the outlet flow path. In this way, the traveling wind entered the cover collides with the electrical components positioned at facing positions, and thus the cooling effect to the electrical components can be enhanced. Since the foreign object collides with the deflection wall, the speed of the foreign object is reduced, and even if the foreign object enters the cover, the impact when the foreign object collides with the electrical components can be alleviated. Accordingly, the influence of the entry of the foreign object into the cover can be reduced.

Aspect 2

According to the aspect 1 of the present disclosure, the duct may include a discharge wall having a through hole penetrating in an up-down direction, the discharge wall being positioned on an upstream side of the deflection wall in the flow direction, and connected to a lower end portion of the deflection wall.

According to the above aspect, by colliding with the deflection wall, the foreign object included in traveling wind is separated from the traveling wind and falls downward. The foreign object that fell downward is discharged from the through hole to the outside of the duct. In this way, the traveling wind and the foreign object (for example, water or sand) heavier than the traveling wind can be separated by the deflection wall, and the foreign object can be discharged from the through hole to the outside of the duct. Accordingly, the foreign object can be prevented from entering the accommodation space.

Aspect 3

According to the aspect 1 or 2 of the present disclosure, the deflection wall may be configured to deflect the flow of air inside the duct flow path in an up-down direction.

According to the above Aspect, the size of the duct in the vehicle width direction can be reduced as compared with a duct including a deflection wall that deflects the flow of air in the duct flow path in the vehicle width direction.

Aspect 4

According to any one of the aspects 1 to 3 of the present disclosure, the duct may include an outlet duct portion that defines the outlet flow path, and a lower wall of the outlet duct portion may be positioned on the downstream side of the deflection wall in the flow direction and is connected to an upper end portion of the deflection wall.

According to the above aspect, since the outlet duct portion that defines the outlet flow path is connected to the deflection wall, the traveling wind deflected by the deflection wall immediately enters the outlet flow path. Therefore, the duct can be made compact in the front-rear direction.

Aspect 5

According to any one of the aspects 1 to 4 of the present disclosure, the cover may include a cover side wall that covers the accommodation space from an outer side in a vehicle width direction, and a cover front wall connected to the cover side wall to cover the accommodation space from a front side of the accommodation space. The cover inlet may be positioned on the cover front wall. The duct may be disposed on an inner side in the vehicle width direction with respect to the cover side wall.

According to the above aspect, an increase in the size of the vehicle in the vehicle width direction can be prevented by the cover.

Aspect 6

According to any one of the aspects 1 to 5 of the present disclosure, the duct inlet may be positioned on a front side of the cover inlet. The deflection wall may be positioned between the duct inlet and the cover inlet in a front-rear direction. The duct inlet, the deflection wall, and the cover inlet may be arranged in the front-rear direction such that the entire cover inlet overlaps the duct inlet and overlaps the deflection wall in a front view.

According to the above aspect, the foreign object passed through the duct inlet from front to rear can be prevented from directly entering the accommodation space by the deflection wall.

Aspect 7

According to any one of the aspects 1 to 4 of the present disclosure, the at least one deflection wall may include a plurality of deflection walls.

According to the above aspect, an effect of reducing the speed of the foreign object entered the duct is enhanced.

Aspect 8

According to the aspect 7 of the present disclosure, the duct may be positioned on an inner side in a vehicle width direction with respect to an end portion of the cover on an outer side in the vehicle width direction in front of the cover, and a lower end portion of the duct is positioned below an upper end portion of the accommodation space. An area of the duct inlet may be larger than an area of the cover inlet. Among the plurality of deflection walls, a first deflection wall may be configured to guide air downward, and a second deflection wall is configured to guide air upward at the downstream side of the first deflection wall in the flow direction. The duct flow path may include: an inlet flow path facing the first deflection wall and having a flow path cross-sectional area that decreases toward the downstream side in the flow direction; and a deflection flow path positioned between the inlet flow path and the outlet flow path in the flow direction of air and configured to guide air by the second deflection wall.

According to the above aspect, with the compact structure, the influence of the foreign object can be reduced while increasing the flow speed of air directed to the electrical components.

Aspect 9

According to any one of the aspects 1 to 8 of the present disclosure, the vehicle may include an engine that is a driving source for travelling. The electrical component may be a rotation sensor configured to detect a rotation angle of a rotor connected to an output shaft of the engine. The rotation sensor may be disposed to face the cover inlet in a front-rear direction.

According to the above aspect, since the air flowing into the accommodation space from the cover inlet directly hits the rotation sensor, and thus the rotation sensor can be effectively cooled.

Aspect 10

According to any one of the aspects 1 to 9 of the present disclosure, the cover may include a cover lower wall that covers the accommodation space from below, and the cover outlet may be positioned on the cover lower wall.

According to the above aspect, since the cover outlet is positioned on the cover lower wall, the foreign object entered the accommodation space is easily discharged from the cover outlet.

Aspect 11

According to any one of the aspects 1 to 10 of the present disclosure, the cover may have a foreign object discharge hole disposed at a lowermost end of the accommodation space.

According to the above aspect, accumulation of the foreign object in the accommodation space can be prevented.

Aspect 12

According to another aspect of the present disclosure, a vehicle includes: a vehicle body frame; an electrical component supported on the vehicle body frame; a cover that defines an accommodation space in which the electrical component is accommodated, the cover including a cover inlet configured to introduce air into the accommodation space, and a cover outlet configured to discharge air from the accommodation space; and a duct connected to the cover, the duct including a duct inlet facing forward in a traveling direction, a duct outlet communicating with the cover inlet, a duct flow path configured to guide air flowing from the duct inlet to the duct outlet, and at least one deflection wall configured to deflect a flow of air in the duct flow path. The duct includes a discharge wall having a through hole penetrating in an up-down direction, the discharge wall being positioned on an upstream side of the deflection wall in the flow direction, and connected to a lower end portion of the deflection wall.

According to the above aspect, the traveling wind passes through the duct and is guided from the cover inlet to the accommodation space. Since heat of the electrical components is taken away while the traveling wind flows from the inlet to the outlet of the accommodation space, an increase in the temperature of the electrical components can be prevented. According to the above aspect, the traveling wind passing through the duct is directed to the accommodation space by changing the direction of the traveling wind by the deflection wall. On the other hand, by colliding with the deflection wall, the foreign object included in traveling wind is separated from the traveling wind and falls downward. The foreign object that fell downward is discharged from the through hole to the outside of the duct. The traveling wind and the foreign object (for example, water or sand) heavier than the traveling wind can be separated by the deflection wall, and the foreign object can be discharged from the through hole to the outside of the duct. Accordingly, the foreign object can be prevented from entering the accommodation space.

Aspect 13

According to another aspect of the present disclosure, a cooling structure for cooling an electrical component mounted on a vehicle that is capable of traveling, includes: the electrical component; a cover that defines an accommodation space in which the electrical component is accommodated, the cover including a cover inlet configured to introduce air into the accommodation space, and a cover outlet configured to discharge air from the accommodation space; and a duct connected to the cover, the duct including a duct inlet facing forward in a traveling direction, a duct outlet communicating with the cover inlet, a duct flow path configured to guide air flowing from the duct inlet to the duct outlet, and at least one deflection wall configured to deflect a flow of air in the duct flow path. The duct flow path includes an outlet flow path that is a flow path positioned on a downstream side of the deflection wall in a flow direction of air and linearly extending from the duct outlet, and the electrical component is disposed to face the cover inlet in an extending direction of the outlet flow path.

What is claimed is:

1. A vehicle, comprising:
a vehicle body frame;
an electrical component supported on the vehicle body frame;
a cover that defines an accommodation space in which the electrical component is accommodated, the cover including a cover inlet configured to introduce air into the accommodation space, and a cover outlet configured to discharge air from the accommodation space; and
a duct connected to the cover, the duct including a duct inlet facing forward in a traveling direction, a duct outlet communicating with the cover inlet, a duct flow path configured to guide air flowing from the duct inlet to the duct outlet, and at least one deflection wall configured to deflect a flow of air inside the duct flow path, wherein
the duct flow path includes an outlet flow path that is a flow path positioned on a downstream side of the deflection wall in a flow direction of air and extending toward the duct outlet, and an inlet flow path that is positioned on an upstream side of the deflection wall in the flow direction of air,
the electrical component is disposed to face the cover inlet in an extending direction of the outlet flow path,
the duct includes an inlet duct portion having a shape of restricting the flow of air in the inlet flow path to make a flow speed of air passing through an opening faster than a flow speed of air passing through the duct inlet, and
the duct includes a discharge wall having a through hole penetrating in an up-down direction, the discharge wall being positioned on an upstream side of the deflection wall in the flow direction, and connected to a lower end portion of the deflection wall.

2. The vehicle according to claim 1, wherein
the cover includes a cover side wall that covers the accommodation space from an outer side in a vehicle width direction, and a cover front wall connected to the cover side wall to cover the accommodation space from a front side of the accommodation space,
the cover inlet is positioned on the cover front wall, and
the duct is disposed on an inner side in the vehicle width direction with respect to the cover side wall.

3. The vehicle according to claim 1, wherein
the at least one deflection wall includes a plurality of deflection walls.

4. The vehicle according to claim 1, wherein
the cover includes a cover lower wall that covers the accommodation space from below, and
the cover outlet is positioned on the cover lower wall.

5. The vehicle according to claim 1, wherein
the cover has a foreign object discharge hole disposed at a lowermost end of the accommodation space.

6. The vehicle according to claim 1, wherein
an inlet flow path has a flow path cross-sectional area that decreases toward the downstream side in the flow direction.

7. The vehicle according to claim 1, wherein
in a front view, the duct is positioned to overlap the cover, and a lower end portion of the duct is positioned below upper end portions of the accommodation space and a cover peripheral wall of the cover.

8. A vehicle, comprising:
a vehicle body frame;
an electrical component supported on the vehicle body frame;
a cover that defines an accommodation space in which the electrical component is accommodated, the cover including a cover inlet configured to introduce air into the accommodation space, and a cover outlet configured to discharge air from the accommodation space; and a duct connected to the cover, the duct including a duct inlet facing forward in a traveling direction, a duct outlet communicating with the cover inlet, a duct flow path configured to guide air flowing from the duct inlet to the duct outlet, and at least one deflection wall configured to deflect a flow of air inside the duct flow path, wherein the duct flow path includes an outlet flow path that is a flow path positioned on a downstream side of the deflection wall in a flow direction of air and extending toward the duct outlet, and an inlet flow path that is positioned on an upstream side of the deflection wall in the flow direction of air, the electrical component is disposed to face the cover inlet in an extending direction of the outlet flow path, the duct includes an inlet duct portion having a shape of restricting the flow of air in the inlet flow path to make a flow speed of air passing through an opening faster than a flow speed of air passing through the duct inlet, and the deflection wall is configured to deflect the flow of air inside the duct flow path in an up-down direction such that the air deflected in the up-down direction is introduced to the duct outlet.

9. A vehicle, comprising:

a vehicle body frame;

an electrical component supported on the vehicle body frame;

a cover that defines an accommodation space in which the electrical component is accommodated, the cover including a cover inlet configured to introduce air into the accommodation space, and a cover outlet configured to discharge air from the accommodation space; and a duct connected to the cover, the duct including a duct inlet facing forward in a traveling direction, a duct outlet communicating with the cover inlet, a duct flow path configured to guide air flowing from the duct inlet to the duct outlet, and at least one deflection wall configured to deflect a flow of air inside the duct flow path, wherein the duct flow path includes an outlet flow path that is a flow path positioned on a downstream side of the deflection wall in a flow direction of air and extending toward the duct outlet, and an inlet flow path that is positioned on an upstream side of the deflection wall in the flow direction of air, the electrical component is disposed to face the cover inlet in an extending direction of the outlet flow path, the duct includes an inlet duct portion having a shape of restricting the flow of air in the inlet flow path to make a flow speed of air passing through an opening faster than a flow speed of air passing through the duct inlet, the duct includes an outlet duct portion that defines the outlet flow path, and a lower wall of the outlet duct portion is positioned on the downstream side of the deflection wall in the flow direction and is connected to an upper end portion of the deflection wall.

10. A vehicle, comprising:

a vehicle body frame;

an electrical component supported on the vehicle body frame;

a cover that defines an accommodation space in which the electrical component is accommodated, the cover including a cover inlet configured to introduce air into the accommodation space, and a cover outlet configured to discharge air from the accommodation space; and a duct connected to the cover, the duct including a duct inlet facing forward in a traveling direction, a duct outlet communicating with the cover inlet, a duct flow path configured to guide air flowing from the duct inlet to the duct outlet, and at least one deflection wall configured to deflect a flow of air inside the duct flow path, wherein the duct flow path includes an outlet flow path that is a flow path positioned on a downstream side of the deflection wall in a flow direction of air and extending toward the duct outlet, and an inlet flow path that is positioned on an upstream side of the deflection wall in the flow direction of air, the electrical component is disposed to face the cover inlet in an extending direction of the outlet flow path, the duct includes an inlet duct portion having a shape of restricting the flow of air in the inlet flow path to make a flow speed of air passing through an opening faster than a flow speed of air passing through the duct inlet, and the at least one deflection wall includes a first deflection wall configured to deflect the air downward, and a second deflection wall configured to deflect the air deflected by first deflection wall upward to guide the air to the duct outlet.

11. The vehicle according to claim 10, wherein the duct is positioned on an inner side in a vehicle width direction with respect to an end portion of the cover on an outer side in the vehicle width direction in front of the cover, and a lower end portion of the duct is positioned below an upper end portion of the accommodation space, a flow path cross-sectional area of the duct inlet is larger than a flow path cross-sectional area of the cover inlet, and the duct flow path includes: an inlet flow path facing the first deflection wall and having the flow path cross-sectional area that decreases toward the downstream side in the flow direction; and a deflection flow path positioned between the inlet flow path and the outlet flow path in the flow direction of air and configured to guide air by the second deflection wall.

* * * * *